United States Patent
Johnson et al.

(10) Patent No.: US 6,907,895 B2
(45) Date of Patent: Jun. 21, 2005

(54) METHOD FOR MICROFLUIDIC FLOW MANIPULATION

(75) Inventors: Timothy J. Johnson, Charlestown, MA (US); David J. Ross, Silver Spring, MD (US); Laurie E. Locascio, North Potomac, MD (US)

(73) Assignee: The United States of America as represented by the Secretary of Commerce, Washington, DC (US)

(*) Notice: Subject to any disclaimer, the term of this patent is extended or adjusted under 35 U.S.C. 154(b) by 138 days.

(21) Appl. No.: 10/188,664

(22) Filed: Jul. 1, 2002

(65) Prior Publication Data

US 2003/0051760 A1 Mar. 20, 2003

Related U.S. Application Data

(60) Provisional application No. 60/323,509, filed on Sep. 19, 2001.

(51) Int. Cl.[7] .................................................. B01F 13/02
(52) U.S. Cl. ............................ 137/1; 137/896; 366/341; 366/348
(58) Field of Search ......................... 137/1, 896, 897, 137/898; 366/341, 348

(56) References Cited

U.S. PATENT DOCUMENTS 3,226,036 A * 12/1965 Grahn ........................ 366/101
3,788,557 A * 1/1974 Breunsbach ................ 137/897
5,900,130 A * 5/1999 Benvegnu et al. ....... 366/DIG. 2

OTHER PUBLICATIONS

Armand Ajdari, *Transverse electrokinetic and microfluidic effects in micropatterned channels: Lubrication analysis for slah geometrics*, The American Physical Society, Physical Review E, vol. 65, 016301.

Abraham D. Stroock, Stephan K. W. Dertinger, Armand Ajdari, Igor Mezić, Howard A. Stone, George M. Whitesides, *Chaotic Mixer for Microchannels* Science, vol. 295, Jan. 25, 2002, pp. 647–651.

* cited by examiner

Primary Examiner—Stephen M. Hepperle
(74) Attorney, Agent, or Firm—Cochran Freund & Young LLC

(57) ABSTRACT

Disclosed is an apparatus and method for the mixing of two microfluidic channels wherein several wells are oriented diagonally across the width of a mixing channel. The device effectively mixes the confluent streams with electrokinetic flow, and to a lesser degree, with pressure driven flow. The device and method may be further adapted to split a pair of confluent streams into two or more streams of equal or non-equal concentrations of reactants. Further, under electrokinetic flow, the surfaces of said wells may be specially coated so that the differing electroosmotic mobility between the surfaces of the wells and the surfaces of the channel may increase the mixing efficiency. The device and method are applicable to the steady state mixing as well as the dynamic application of mixing a plug of reagent with a confluent stream.

7 Claims, 20 Drawing Sheets

RHODAMINE B
CONCENTRATION (mM)

METHOD FOR MICROFLUIDIC FLOW MANIPULATION

CROSS REFERENCE TO RELATED APPLICATIONS

This application is based upon and claims priority to U.S. provisional application 60/323,509 entitled "MICROCHANNEL DESIGNS FOR MIXING AND SPLITTING MICROFLUIDIC STREAMS UNDER ELECTROKINETIC OR PRESSURE DRIVEN FLOW" filed Sep. 19, 2001 by Timothy J Johnson, David J Ross, and Laurie E Locascio, the entire disclosure is specifically incorporated herein by reference for all that it discloses and teaches.

BACKGROUND OF THE INVENTION a. Field of the Invention

The present invention pertains generally to microfluidic flow devices and specifically to mixers and splitters of microfluidic flow.

b. Description of the Background

The application of microfluidic analytical devices to chemical or biological assays has developed rapidly over the last decade. Although microfluidic devices have been highly successful, several performance limitations exist, notably reagent mixing.

Most mixing devices rely on diffusive mixing, wherein the natural laminar flow effects and the reagent's inherent diffusion coefficient cause the reagents to mix. Therefore, the mixing chamber/channel is usually extended to lengths that will ensure a completely mixed outlet stream. This approach may be acceptable for low flowrates, but high flowrates (>1 cm/s) or low analyte diffusion coefficients ($<10^{-7}$ cm/s$^2$) will require excessively long mixing channels. The difficulty in rapidly mixing reagents results from the fact that the system is restricted to the laminar flow regime (Re<2000) and also because the feature sizes are too small (typically <100 $\mu$m) to incorporate conventional mixing mechanisms.

The lack of turbulence in microfluidic systems has led to device designs that utilize multi-laminate, or flow splitting techniques to accomplish mixing in channels of shorter length. These designs split the incoming streams into several narrower confluent streams to reduce the mixing equilibrium time. Once mixing is complete, the narrow channels are then brought back together into a larger main channel for further transport, processing, and/or detection. The effectiveness of the flow splitting concept is based on the fact that the equilibrium time scales quadratically with the width of the channel. For example, if the width of the channel decreases by two, then the equilibrium time and the channel length decreased by a factor of four, or 25% of the original length. However, even a mixing length of 25% may still be unsuitable for some applications.

Other techniques for mixing may rely on active mechanical mixing, such as stirring paddles and the like. For very small fluidic passages, such devices are extremely fragile and difficult to manufacture.

It would therefore be advantageous to provide a device and method of mixing two confluent microfluidic laminar flows that did not require an excessively long channel to effectively mix the flows. Further, it would be advantageous to provide a splitting mechanism that may be able to split a stream of reagents into two streams of differing concentrations.

SUMMARY OF THE INVENTION

The present invention overcomes the disadvantages and limitations of the prior art by providing a device and method for effectively mixing two confluent laminar reagents within a very short stream length. This is accomplished by passing the confluent laminar flows over a series of narrow wells that are angled across the width of the channel. The device and method may also be used to split incoming streams into multiple streams of equal or non-equal proportions. Additionally, the present invention may be used for the mixing of plugs of reagents while minimizing axial dispersion of the reagent plug.

The present invention may therefore comprise a mixer of laminar microfluidic streams propelled by electrokinetic flow comprising: a first inlet channel; a second inlet channel; a mixing channel starting at the confluence of the first inlet channel and the second inlet channel; and a plurality of wells disposed in the mixing channel, the wells being obliquely oriented substantially across the width of the mixing channel.

The present invention may further comprise a splitter of a substantially laminar microfluidic stream comprising: a splitting channel coupled to at least two inlet ports and at least one outlet port in which the substantially laminar microfluidic stream has an axis of flow; and a plurality of wells disposed in the splitting channel, the wells being oriented substantially longitudinally across the width of the channel and diagonally across the axis of flow, the wells being deeper in profile than in width.

The present invention may further comprise a method of mixing two confluent laminar flows in microchannels comprising: providing a first inlet stream and a second inlet stream that meet at a confluence point to produce a confluent stream; passing the confluent stream through a mixing channel, the mixing channel comprising a plurality of wells, the wells being oriented substantially longitudinally across the width of the mixing channel and diagonally across the mixing channel, the wells being deeper in profile than in width; and producing a mixed laminar flow at the output of the mixing channel.

The advantages of the present invention are that flows may be combined and mixed without the conventional long lengths of diffusive mixing. The device may be further adapted to create two or more streams of equal or non-equal proportions of reagents. The device may be adjusted to tune the mix of the flows by adding various wells at different orientations, depths, and with various electroosmotic mobility coatings, all of which may have a substantial effect on the performance of the present invention.

DETAILED DESCRIPTION OF THE INVENTION

Figure 1:
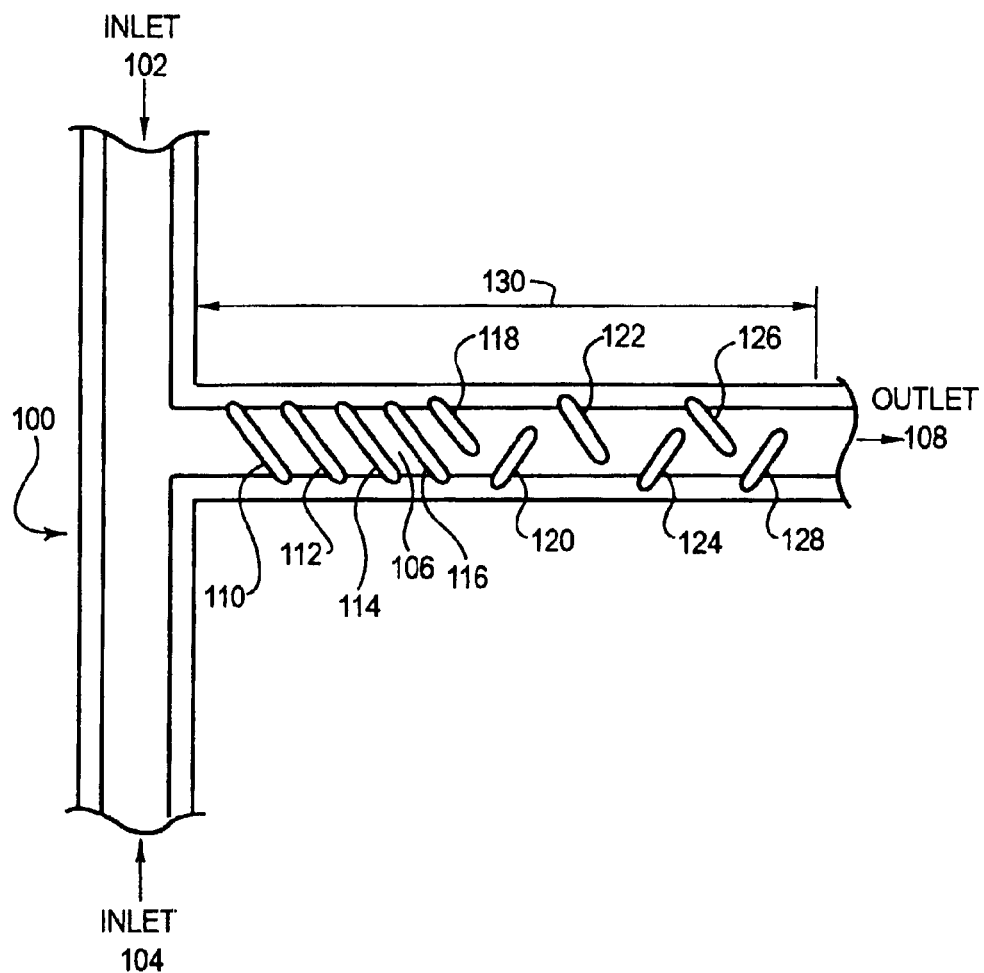
FIG. 1 is an illustration of an embodiment of the present invention of a microfluidic mixer.

FIG. 1 illustrates an embodiment 100 of the present invention of a microfluidic mixer. Two inlet streams 102 and 104 are combined and mixed in the mixing region 106 to produce a mixed flow that exhausts out of the outlet 108. The mixing region 106 comprises several wells 110, 112, 114, 116, 118, 120, 122, 124, 126, and 128 that are recessed into the outlet 108.

In a first embodiment, the channels have a uniform, trapezoidal cross section, with the width at the top being 72 $\mu$m, depth 31 $\mu$m, and the width at the bottom being 28 $\mu$m. The wells 110, 112, 114, 116, 118, 120, 122, 124, 126, and 128 have a depth of 85 $\mu$m in the center of the well.

The wells 110, 112, 114, and 116 are parallel to each other and uniform in size. The wells are angled approximately 45 degrees from the axis of the outlet 108. The wells 118, 120, 122, 124, 126, and 128 are perpendicular to each other and are approximately 45 degrees from the axis of the outlet 108.

The flow of reagents through the embodiment 100 may be electrokinetic, electroosmotic, or pressure driven flow. Since the electroosmotic flow is a wall driven phenomenon based on the surface charge of the microchannel wall and on the local electric field, the fluid may enter and follow the contour of the wells, with the slanted well design used to induce lateral transport across the channel. In a pressure driven flow, the flow is not a wall driven phenomenon and therefore the fluid is not forced to enter the wells like electroosmotic flow. However, the presence of the wells induces some lateral transport across the channel in pressure driven flow, although not as effective as with electroosmotic flow. The presence of the wells under electrokinetic flow, being the combination of both electroosmotic flow and electrophoretic flow, will also enhance the mixing.

In an experiment with the present embodiment, a confluence of Rhodamine B in a carbonate buffer was introduced into inlet 102 and carbonate buffer was introduced into inlet 104. The fluorescence of the Rhodamine B was measured to indicate the degree of mixing achieved by the embodiment 100.

The method of manufacture of the embodiment used in the experiment, as well as the experimental setup and method of measurements, are given elsewhere in this specification.

For the experiments, the length of each channel arm was 0.8 cm long, and the dimensions of the channel are 72 $\mu$m wide at the top, 28 $\mu$m wide at the bottom, and 31 $\mu$m deep. The laser etched wells that spanned across the entire width of the channel had a depth of 85 $\mu$m in the center of the well relative to the bottom of the imprinted channel. The intensity measurement was taken at distance 130 or 443 $\mu$m from the beginning of the confluent region.

Figure 2A:
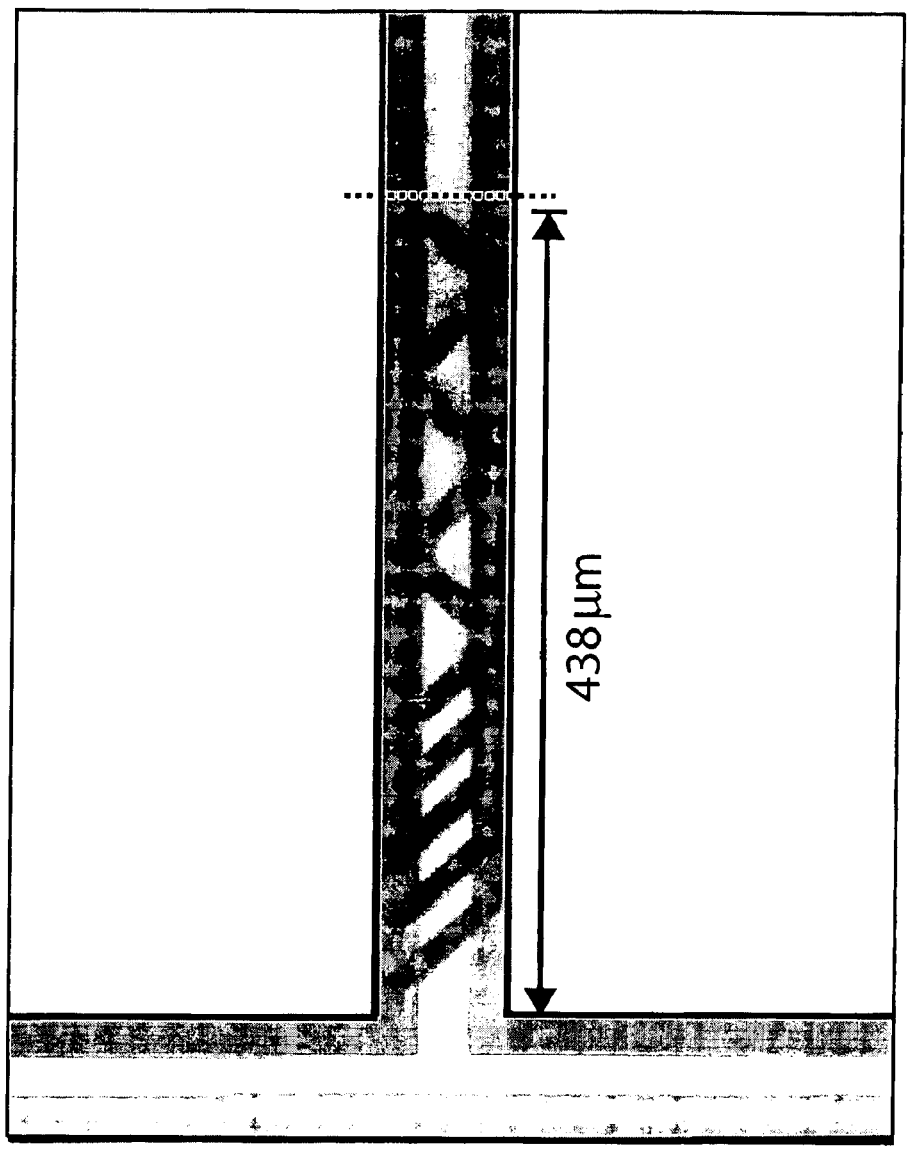
FIG. 2A is a white light microscopy image of the embodiment of FIG. 1.
Figure 2B:
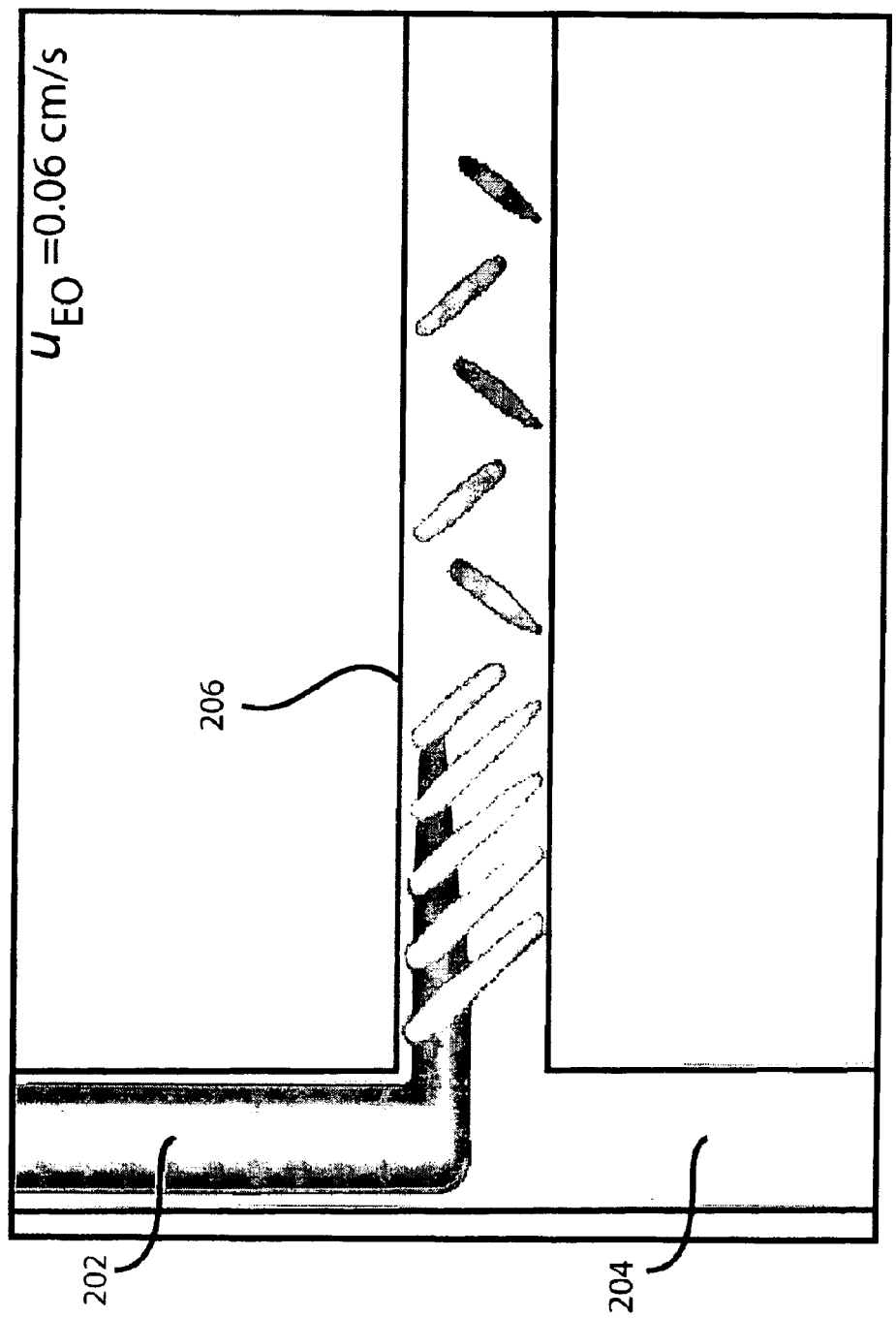
FIG. 2B is an image of the fluorescence of Rhodamine B introduced in the first inlet mixed with the buffer solution introduced in the second inlet.
Figure 2C:
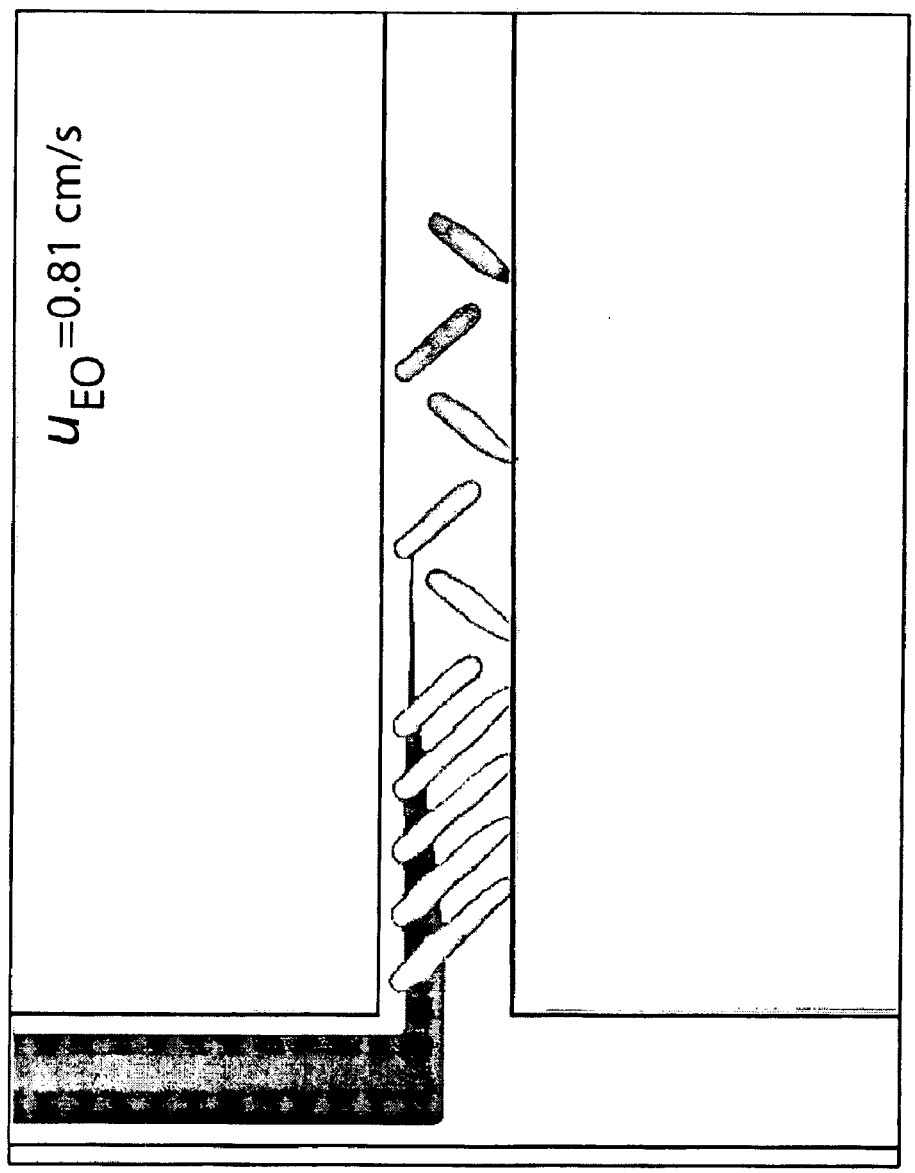
FIG. 2C is a similar image as FIG. 2B, except the flow is 0.81 cm/s.

FIGS. 2A–C illustrate the results of the experiments as detailed elsewhere in this specification. FIG. 2A is a white light microscopy image of the embodiment of FIG. 1. FIG. 2B is an image of the fluorescence of Rhodamine B introduced in the first inlet 202 mixed with the buffer solution introduced in the second inlet 204, producing a mixed stream 206. The flowrate is 0.06 cm/s. FIG. 2C is a similar image as FIG. 2B, except the flow is 0.81 cm/s.

Figure 3:
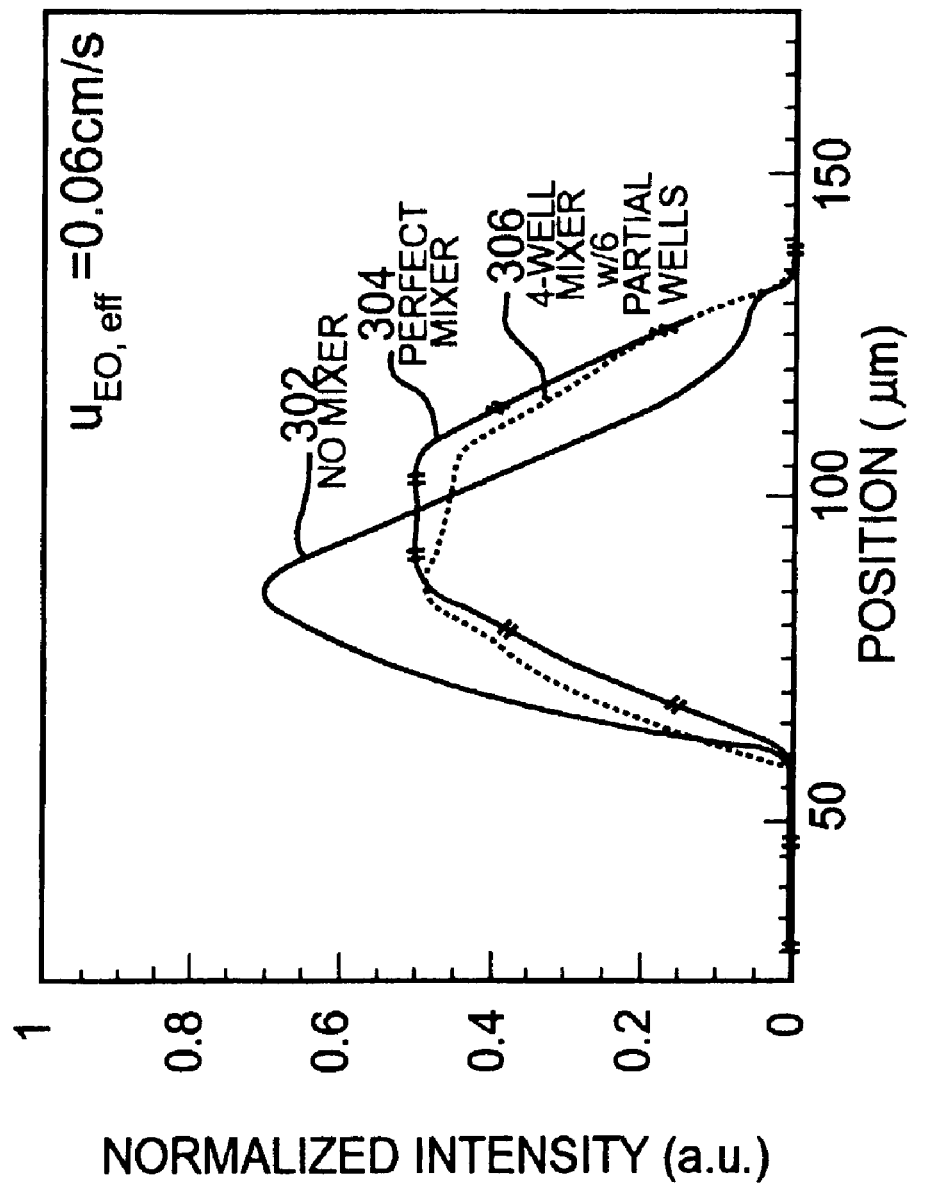
FIG. 3 illustrates experimental results of the degree of mixing of the embodiment of FIG. 2A, wherein an electroosmotic flow of 0.06 cm/s was achieved.

FIG. 3 illustrates the degree of mixing of the embodiment 100, wherein an electroosmotic flow of 0.06 cm/s was achieved. The horizontal axis is the position across the width of the outlet 108 and the vertical axis is the normalized intensity of the fluorescence of the Rhodamine B. The curve 302 represents the results of the measurement taken with no mixing wells present. The curve 304 represents perfect mixing. Curve 304 is trapezoidal in shape, following the profile of the trapezoidal outlet 108. The curve 306 represents the actual experimental results. The details concerning the experimental procedure and equipment used to perform all of the experiments referenced in this specification are given elsewhere in this specification.

Figure 4:
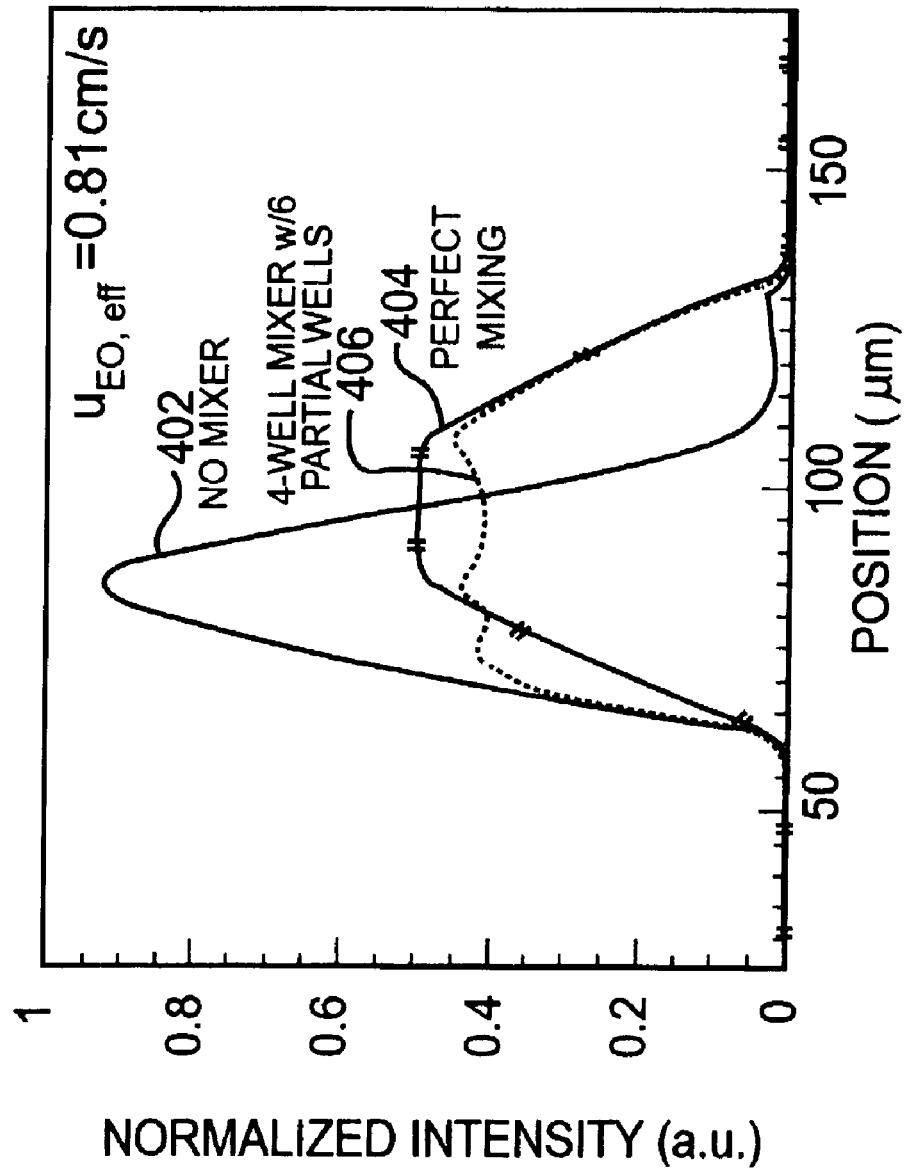
FIG. 4 illustrates the same experimental set up as FIG. 2C, with the electroosmotic flowrate of 0.81 cm/s.

FIG. 4 is a graph that illustrates the same experimental set up as FIG. 3, with the electroosmotic flowrate of 0.81 cm/s. The line 402 represents the results of the measurement taken with no mixing wells present. The line 404 represents perfect mixing. The line 406 represents the actual experimental results.

From the results illustrated in FIGS. 2B, 2C, 3, and 4, the degree of mixing exiting the mixer was 87.2% and 80.5% respectively, for the flowrates of 0.06 cm/s and 0.81 cm/s. To achieve the same degree of mixing, theoretical predictions state that a channel length of 0.2 cm and 2.3 cm for electroosmotic flowrates would be required if no mixer were present and based on diffusional mixing, assuming that the diffusion coefficient of the fluorescent material, Rhodamine B, is $2.8 \times 10^{-6}$ cm$^2$/s. These results indicate that the length of the present embodiment is 22% and 2% of the length of a comparable diffusive mixer for the present application.

Figure 5:
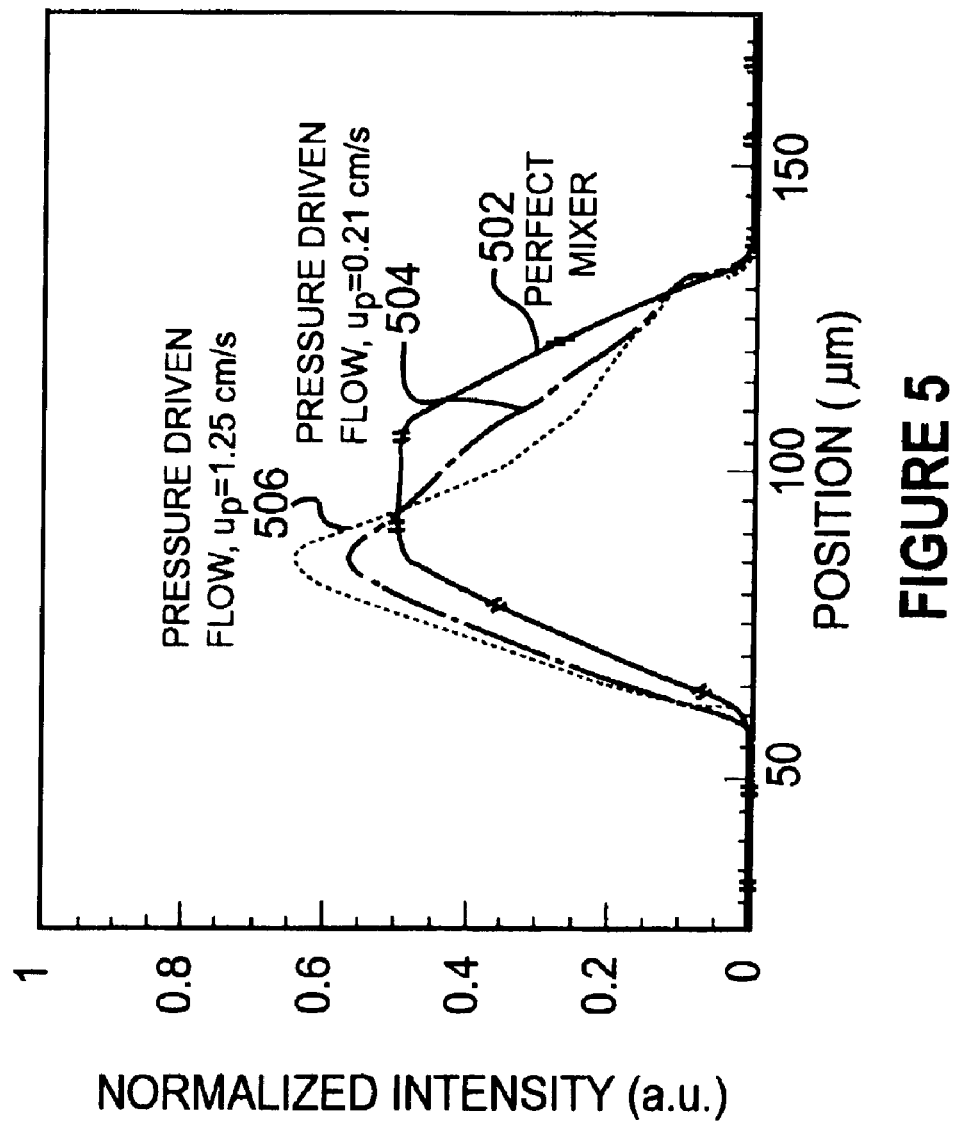
FIG. 5 illustrates the same experimental set up of FIGS. 3 and 4, with a pressure driven flow.

FIG. 5 is a graph that illustrates the results of the same experimental set up of FIGS. 2, 3, and 4, with a pressure driven flow. The measurements were taken at 443 µm from the beginning of the confluence region. The curve 502 represents the perfect mixing results. The curve 504 represents the experimental results with a pressure driven flow at 0.21 cm/s. The curve 506 represents the experimental results with a pressure driven flow at 1.25 cm/s. Since the pressure driven flow is not a wall driven phenomenon and therefore the fluid is not forced to enter the wells like electroosmotic flow, the effects of the mixing are not as great with pressure driven flow as with electroosmotic flow. However, the presence of the wells does introduce some lateral transport across the channel. This suggests that a series of wells could be optimized for mixing under pressure driven flow.

Figure 6:
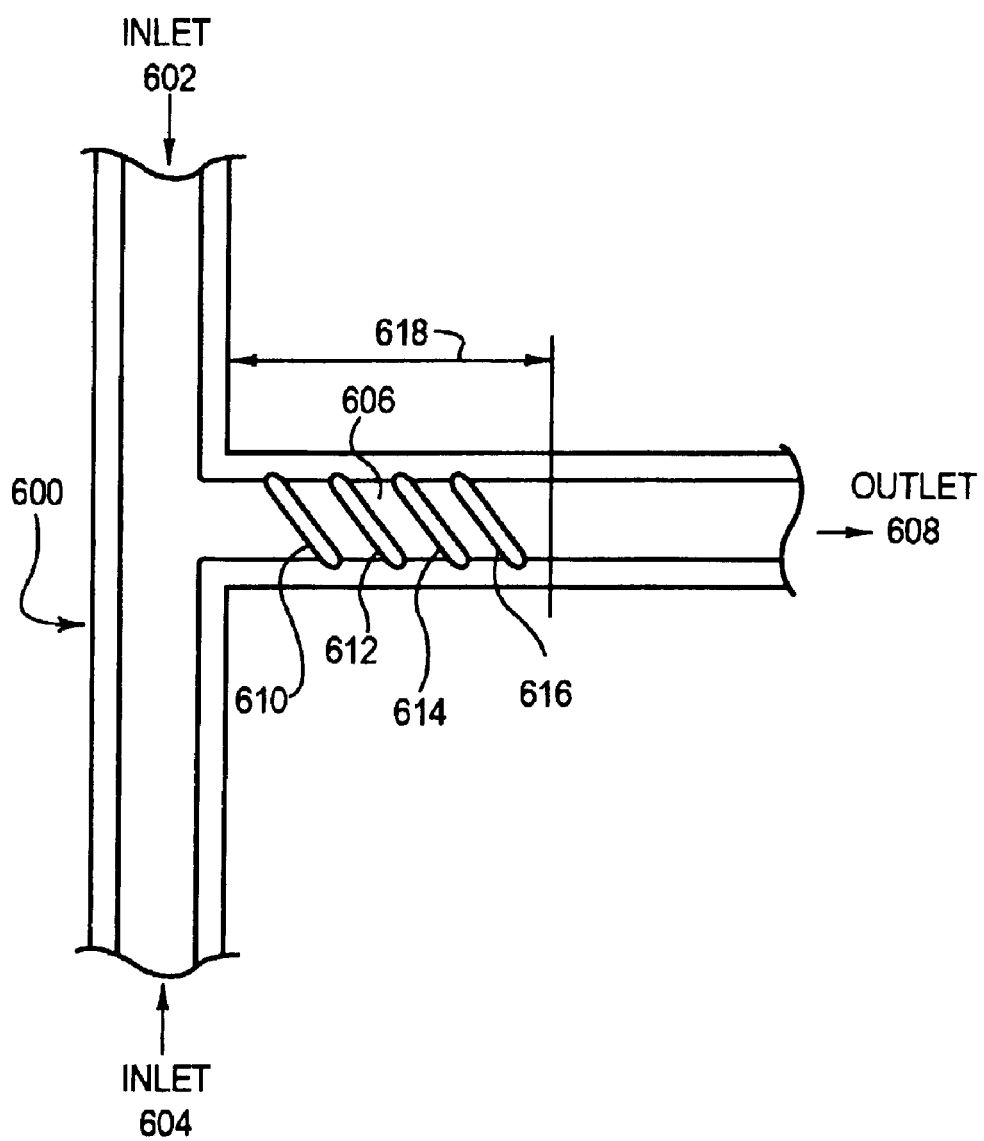
FIG. 6 illustrates a second preferred embodiment of the present invention.

FIG. 6 illustrates a second embodiment 600 of the present invention. Two inlet streams 602 and 604 are combined and mixed in the mixing region 606 to produce a mixed flow that exhausts out of the outlet 608. The mixing region 606 comprises several wells 610, 612, 614, and 616 that are recessed into outlet 608. The measurement region 618 is 183 µm from the point of confluence of the inlets 602 and 604. The shape and dimensions of the channels and wells are the same as with embodiment 100 of FIG. 1. The wells 610, 612, 614, and 616 are parallel to each other.

Figure 7:
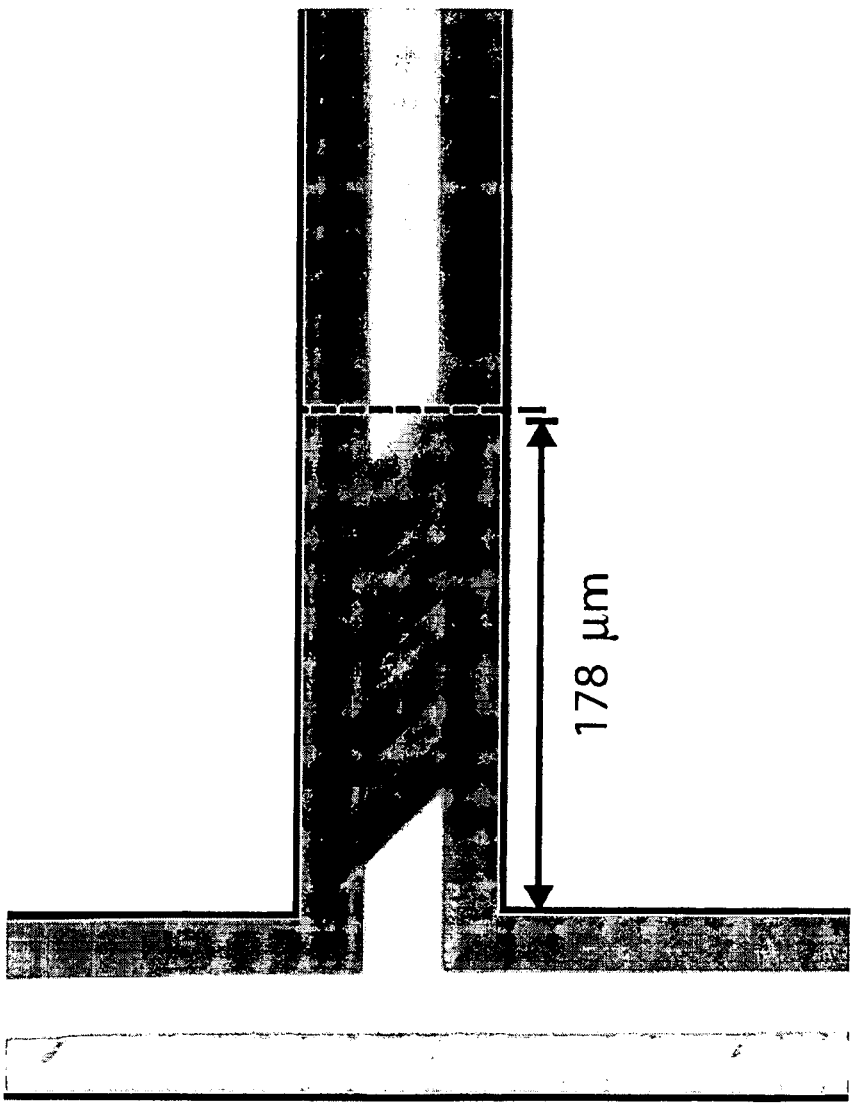
FIG. 7 is a white light microscopy image of the embodiment of FIG. 6.

FIG. 7 is a white light microscopy image of an example of embodiment 600.

Figure 8:
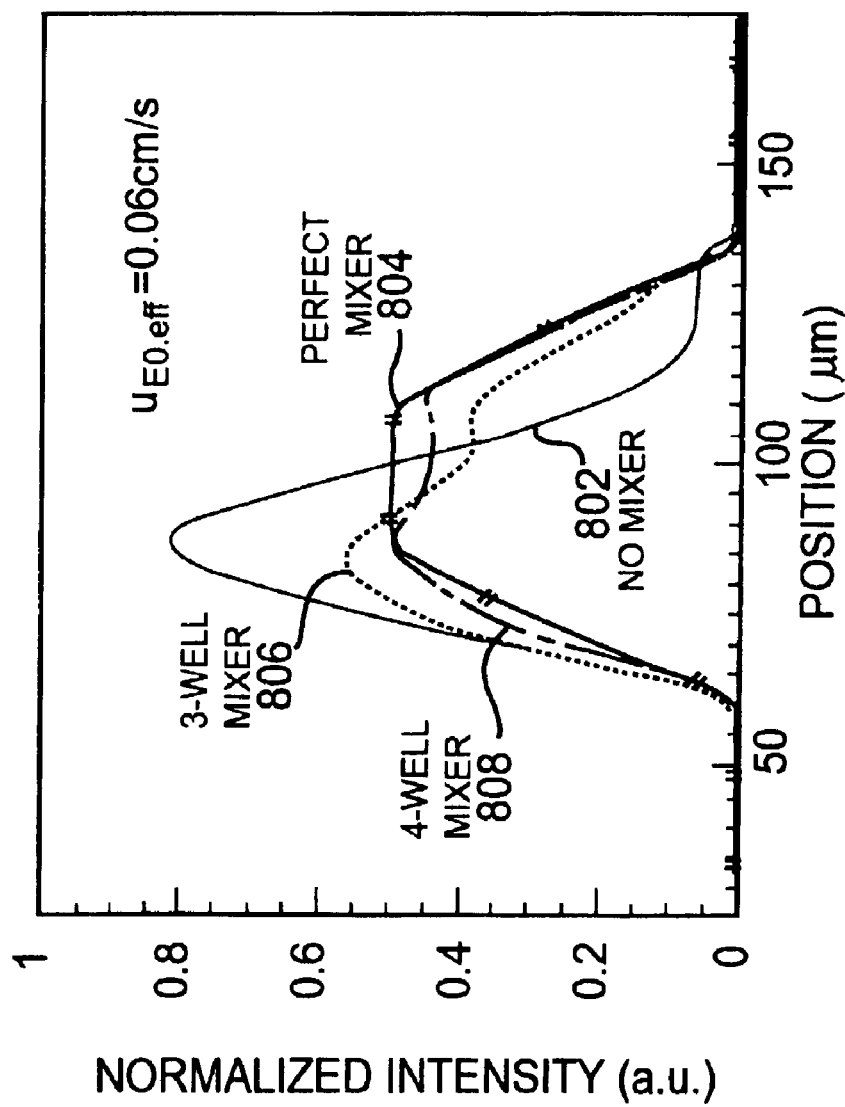
FIG. 8 illustrates experimental results of the degree of mixing of two reagents using embodiment of FIG. 7 and an embodiment similar to embodiment of FIG. 7 but with three wells instead of four.

FIG. 8 is a graph that illustrates the degree of mixing of two reagents using embodiment 600 and an embodiment similar to embodiment 600 but with three wells instead of four. The experimental results of FIG. 8 show results for electroosmotic flow of 0.06 cm/s taken 183 µm from the point of confluence of the inlet flows. The horizontal axis is the position across the width of the outlet stream 608 and the vertical axis is the normalized intensity of Rhodamine B. The same experimental setup was used for the results of FIG. 3 as FIG. 8, with the differences being the configuration of the mixing region and the position of the measurements.

The curve 802 represents the mixing profile of the two inlet streams when no mixing wells are present. The curve 804 represents the perfect mixing of the two streams. The curve 806 represents the mixing profile for the electroosmotic flowrate of 0.06 cm/s and a three well mixer. The curve 808 represents the mixing profile for the same flowrate and a four well mixer. The three well mixer is the embodiment 600 with well 616 removed.

Figure 9:
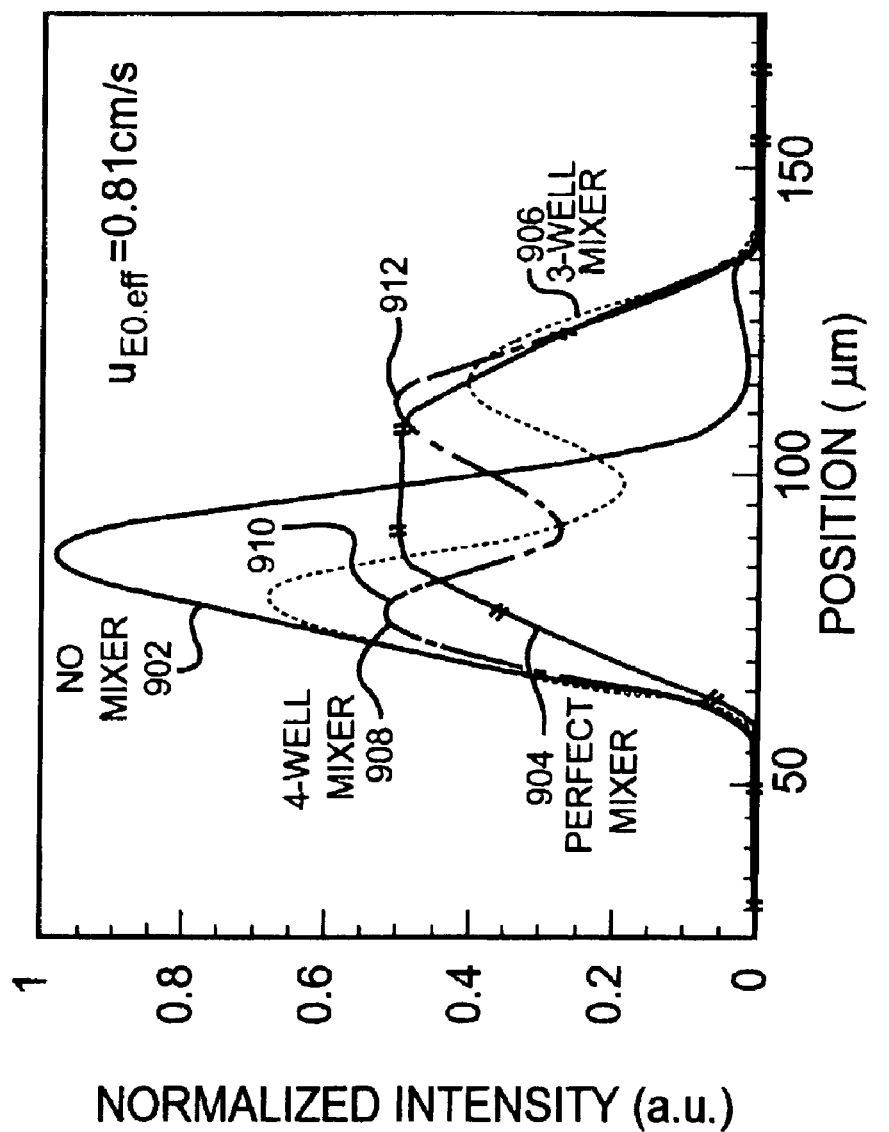
FIG. 9 illustrates the results of the same experimental set up as FIG. 8 with a higher electroosmotic flowrate of 0.81 cm/s.

FIG. 9 illustrates the results of the same experimental set up as FIG. 8 with a higher electroosmotic flowrate of 0.81 cm/s. The curve 902 represents the mixing profile of the two inlet streams when no mixing wells are present. The curve 904 represents the perfect mixing of the two streams. The curve 906 represents the mixing profile for a three well mixer. The curve 908 represents the mixing profile for a four well mixer. The three well mixer is the embodiment 600 with well 616 removed.

The curve 908 forms two distinct humps, 910 and 912, indicating that the four well mixer may be able to split the incoming streams into two streams of similar concentrations. The number of wells, the shape, dimension, and placement of the wells may be adapted to provide different dilutions of the incoming fluid. Such adaptations may depend on the reagents and the diffusivity constants of the various components of the confluent streams. As such, the particular result desired, such as splitting a stream or mixing a pair of confluent streams may be obtained by adjusting the quantity and position of the various wells.

Figure 10:
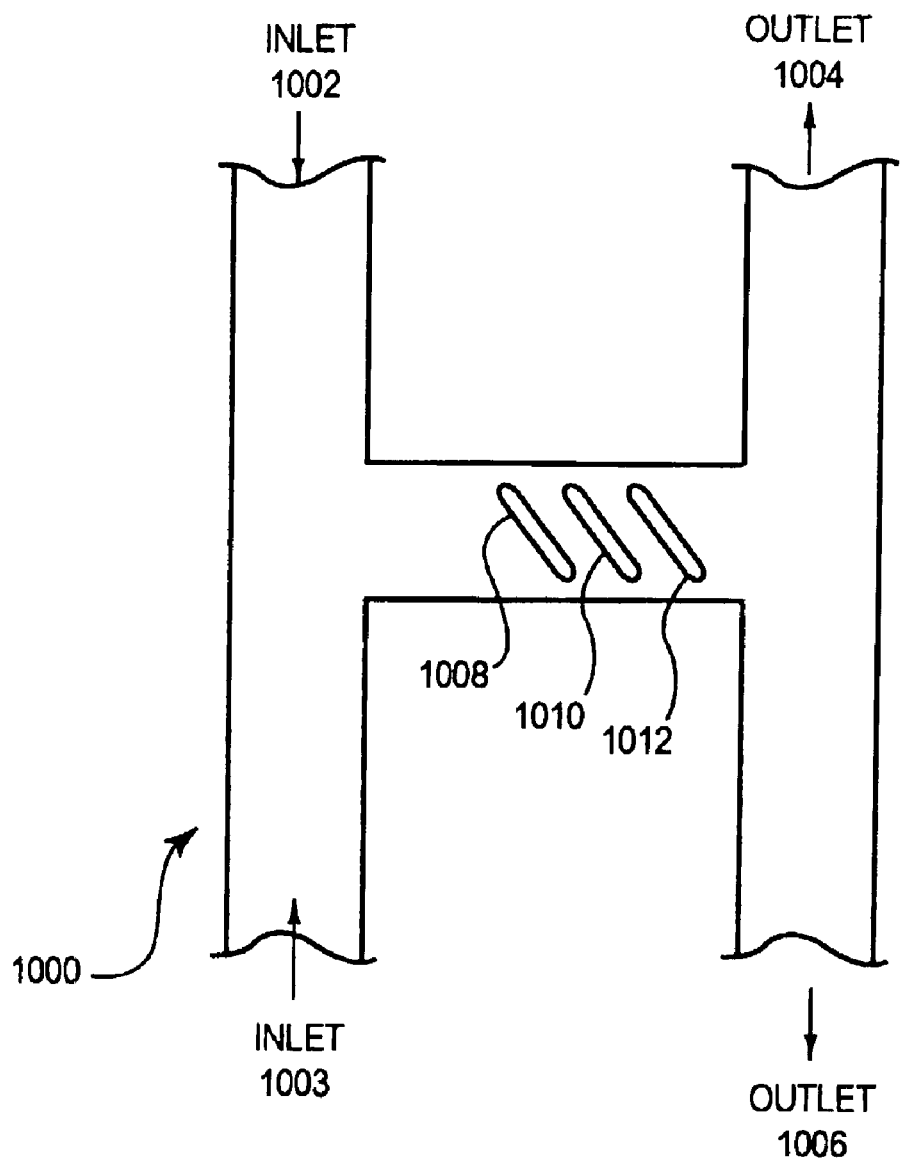
FIG. 10 illustrates an embodiment of a stream splitter wherein two inlet ports form a confluent stream wherein the fluid on one half of the channel is split into two streams located on opposite sides of the channel that then exit through two outlets.

FIG. 10 illustrates an embodiment 1000 of a stream splitter wherein inlet port 1002 and inlet port 1003 form a confluent stream wherein the fluid that is on one half of the channel is split into two streams due to the presence of the slanted wells, where the split streams are located on opposite sides of the channel that then exit through outlet 1004 and outlet 1006. The flow of the microfluidic stream passes over three wells 1008, 1010, and 1012 of similar design and construction as those of other embodiments described in the present specification.

In lab-on-a-chip or µ-TAS (micro Total Analysis Systems), the use of a series of wells within a microchannel may greatly enhance the effectiveness of the entire system, especially when the system is limited to the laminar flow regime. The present invention is effective for low flowrates (<1 cm/s) as well as high flowrates (>1 cm/s). The present invention is further able to effectively mix flows that are driven electrokinetically, electroosmotically, or by pressure.

Several embodiments of the present invention may be used in series, such that one stream is separated and split, then separated and split again, with the end result being several outlet streams with differing dilutions of the original incoming stream. Such a system is known as serial dilution.

Figure 11:
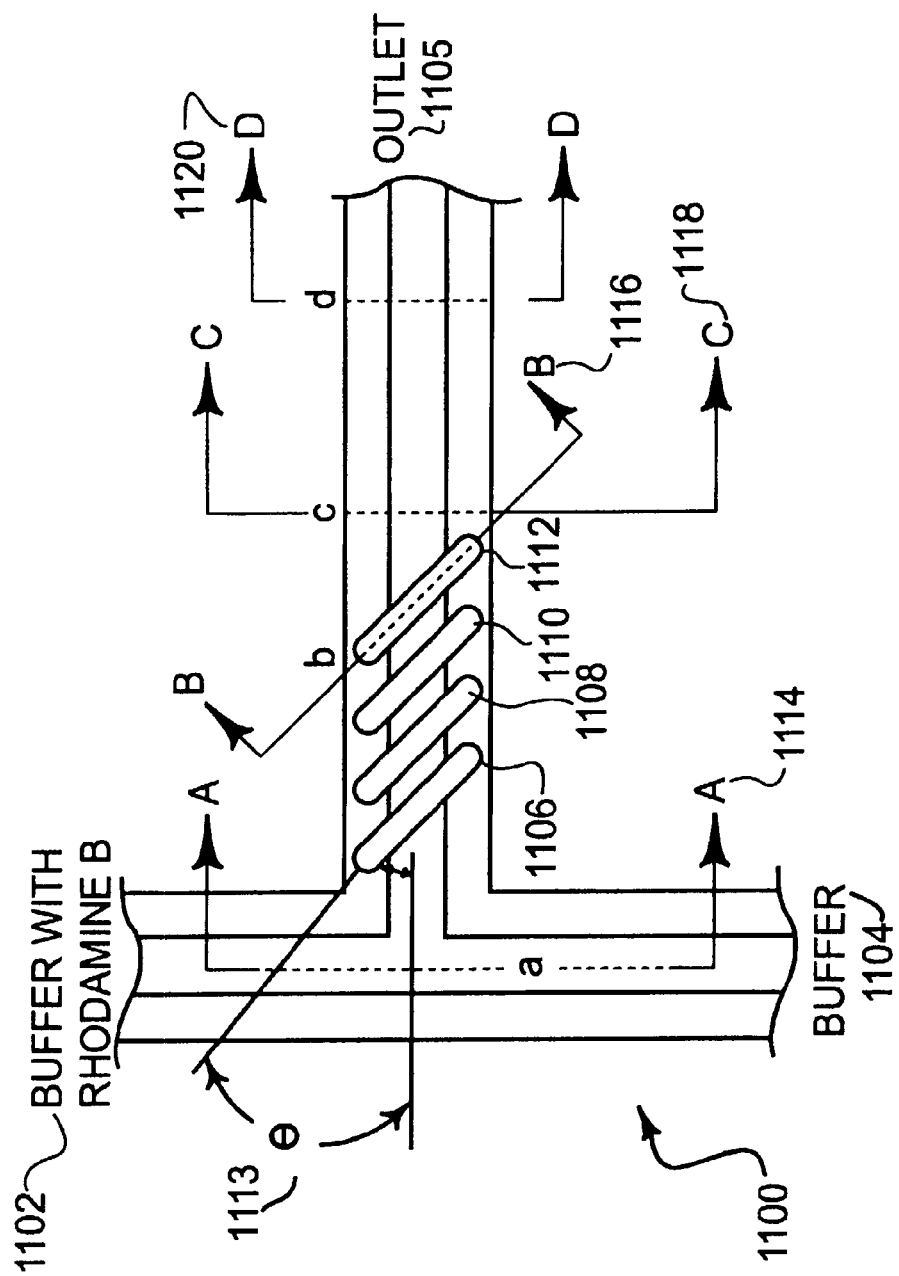
FIG. 11 illustrates an embodiment of a four-well mixer that was analyzed with computational fluid dynamics techniques for variations in the present invention.

FIG. 11 illustrates an embodiment 1100 of a four-well mixer that was analyzed with computational fluid dynamics techniques for variations in the present invention. The computational analyses were designed to correspond to the experimental results shown in the previous figures. The channel geometry and fluid properties were selected to closely match those of the experiments. The inlet 1102 contains a buffer fluid with Rhodamine B that is mixed with a second inlet 1104 that contains only the buffer fluid. The fluid exits the embodiment 1100 via the outlet 1105. The four wells 1106, 1108, 1110, and 1112 are located at an angle theta 1113 from the centerline axis of the mixer. The geometry of the embodiment 1100 is similar to the previous embodiments described herein. Cross-section line A 1114 will be used to illustrate the incoming streams prior to mixing. Cross-section line B 1116 will be used to illustrate the mixing of the streams while in the well 1112, the last of the four wells. Cross-section line C 1118 will be used to illustrate the mixing of the streams 5 µm past the exit of the last well. Cross-section line D 1120 will be used to illustrate the mixing of the streams at a location of 420 µm past the point of confluence.

Figure 12:
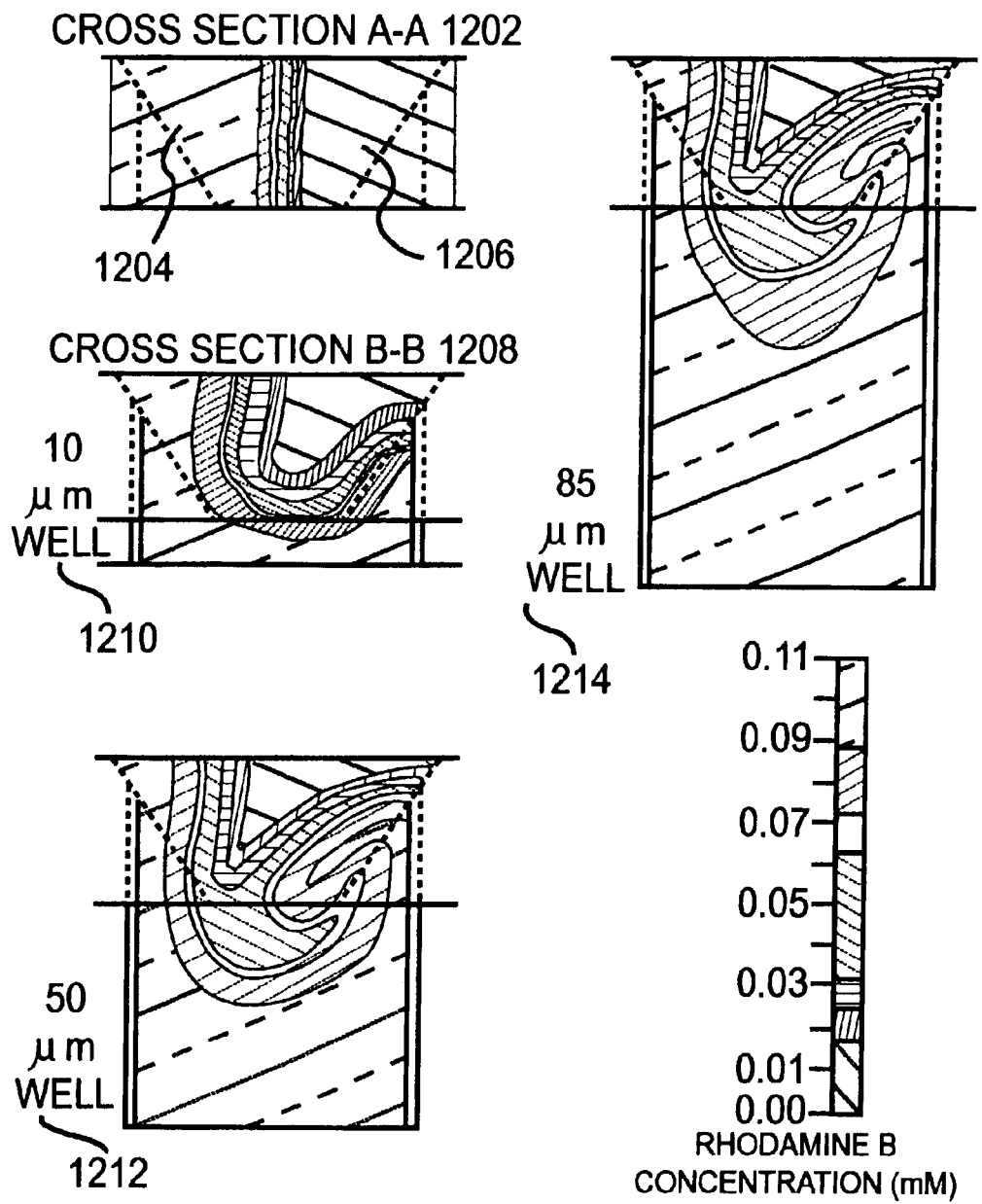
FIG. 12 illustrates some computational analysis of the flow patterns for various depths of wells, based on the embodiment shown in FIG. 11.

FIG. 12 illustrates some computational analyses of the flow patterns for various depths of wells, based on the embodiment 1100 shown in FIG. 11, with a constant well angle of 45°. The results for cross section A 1202 illustrate the two incoming flows 1204 and 1206 prior to mixing. The results for cross section B 1208 illustrate the flow patterns for the flow within the last of the four wells. The 10 µm depth results 1210 show that very little of the mixing is occurring in the well. The 50 µm depth results 1212 show that a substantial portion of the mixing is occurring in the well. The 85 µm depth results 1214 show that a substantial portion of the mixing is occurring in the well, but that there is not much increase in the mixing due to the larger depth over the 50 µm results 1212. These results indicate that there is a finite depth wherein increasing the depth does not increase the degree of mixing substantially. Further, these results illustrate that the wells greatly affect the mixing by forcing the fluids to fold over each other.

Figure 13:
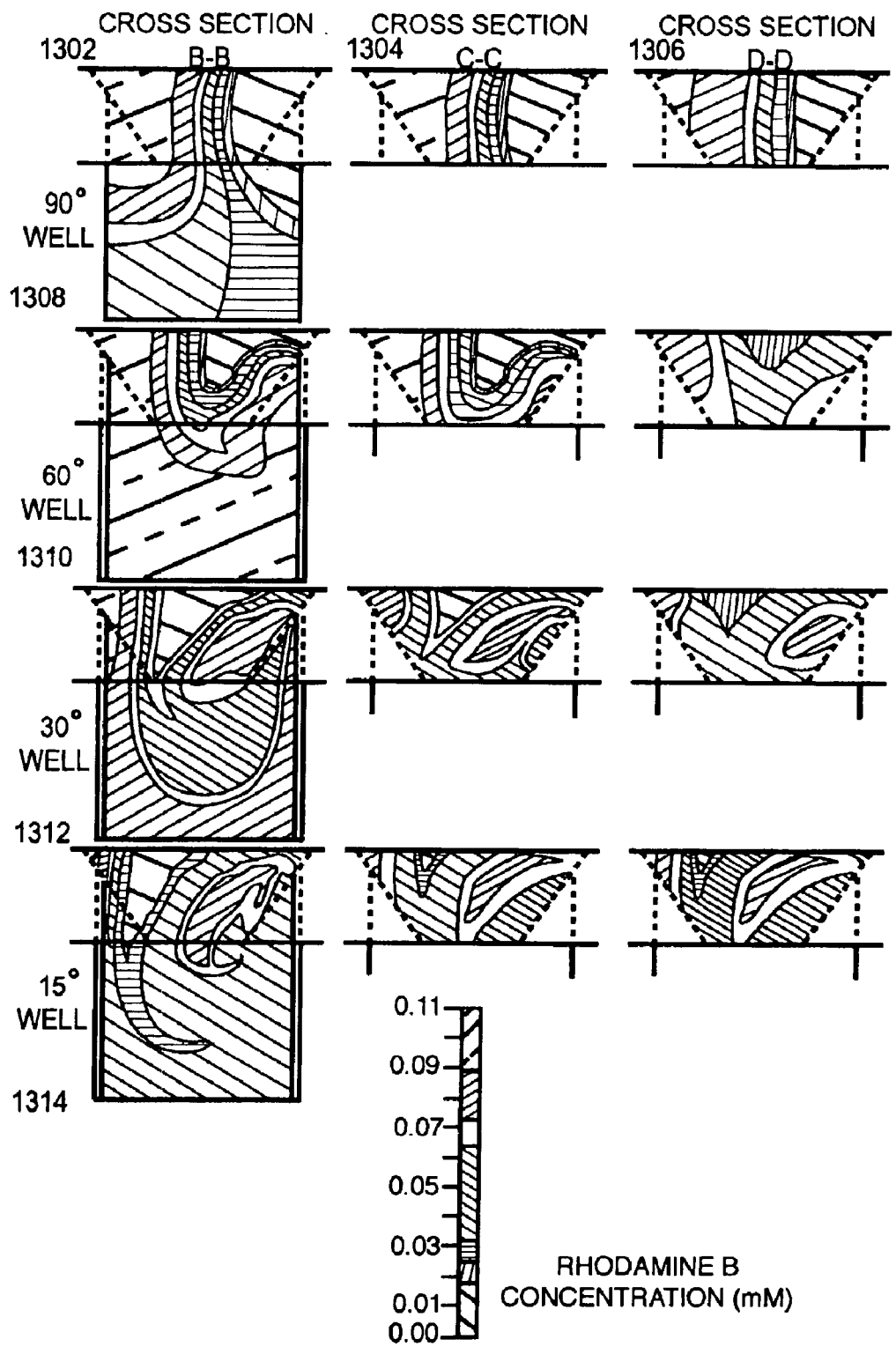
FIG. 13 illustrates some computational results of various angles of the walls, based on the embodiment of FIG. 11.

FIG. 13 illustrates the results of various angles of the wells as represented by the angle theta 1113 of FIG. 11. For all well angles illustrated, the depth of the wells was held constant at 50 µm below the bottom of the imprinted channel. The results of cross section B—B 1302, cross section C—C 1304, and cross section D—D 1306 are shown in columns. The results for the various angled wells are shown in rows. Results along row 1308 are for wells at a right angle or 90 degrees to the axis of flow. Results along rows 1310, 1312, and 1314 are for wells at 60 degrees, 30 degrees, and 15 degrees to the axis of flow. The results indicate that a decreased angle of the well achieves a higher degree of mixing.

The results along row 1308 for right angle wells show that there is no lateral transport across the width of the well. As the angle of the wells is decreased, there is increased lateral transport to the point where the flow may be folded over on top of itself more than once. The folding action is an important mechanism that causes efficient mixing.

Figures 14A, 14B:
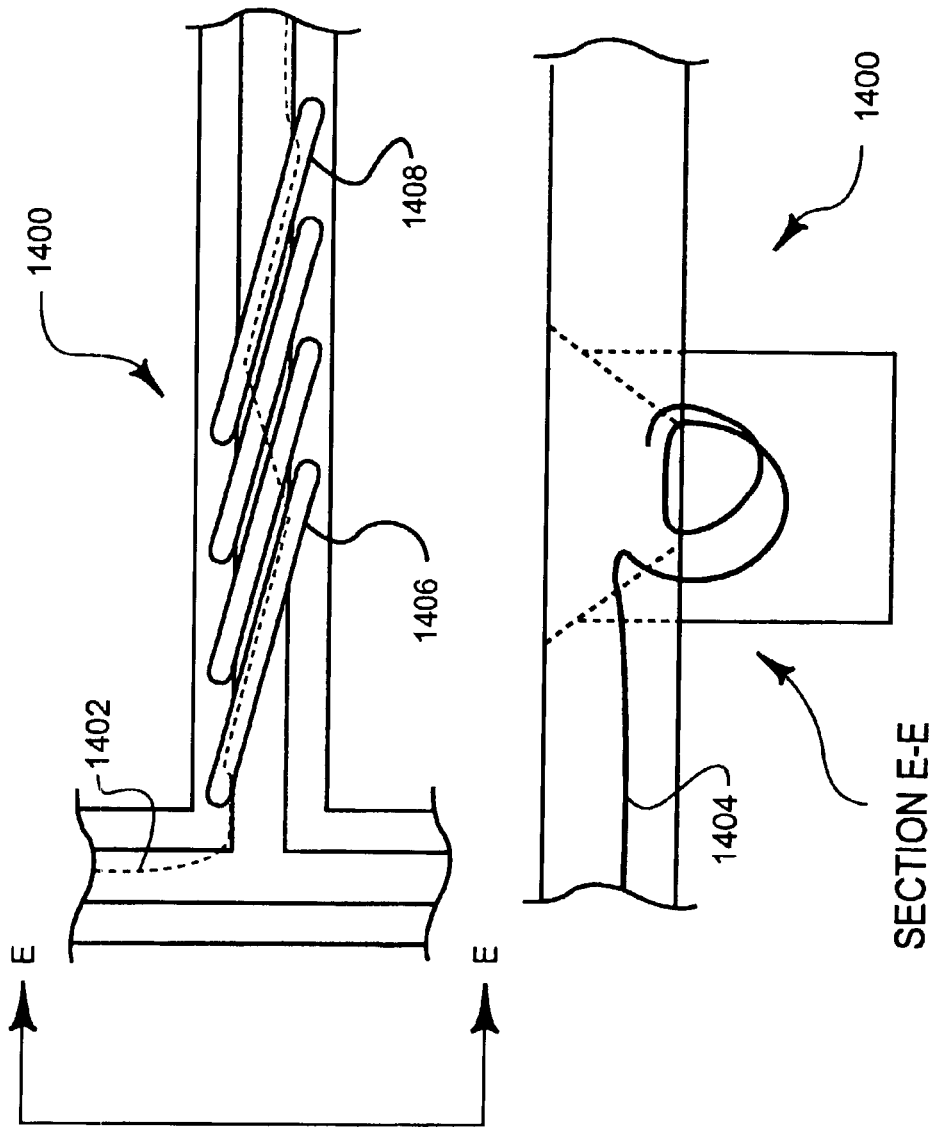
FIG. 14A illustrates a plan view of the flow pattern of an embodiment of the present invention of a mixer with quantity 4 wells oriented at 15 degrees off of the axis of flow.
FIG. 14B illustrates a cross sectional view of the flow pattern of FIG. 14A, as observed from the cross section E—E.

FIG. 14A illustrates a plan view of the flow pattern of an embodiment 1400 of a mixer with quantity 4 wells oriented at 15 degrees off of the axis of flow, and well depths set to 50 µm below the bottom of the imprinted channel. FIG. 14B illustrates a cross sectional view of the flow pattern of FIG. 14A, as observed from the cross section E—E. The flow lines 1402 and 1404 illustrate that the fluid may exit the first well 1406 and reenter another well 1408 and thereby may fold during the passage through the mixer 1400.

Figure 15:
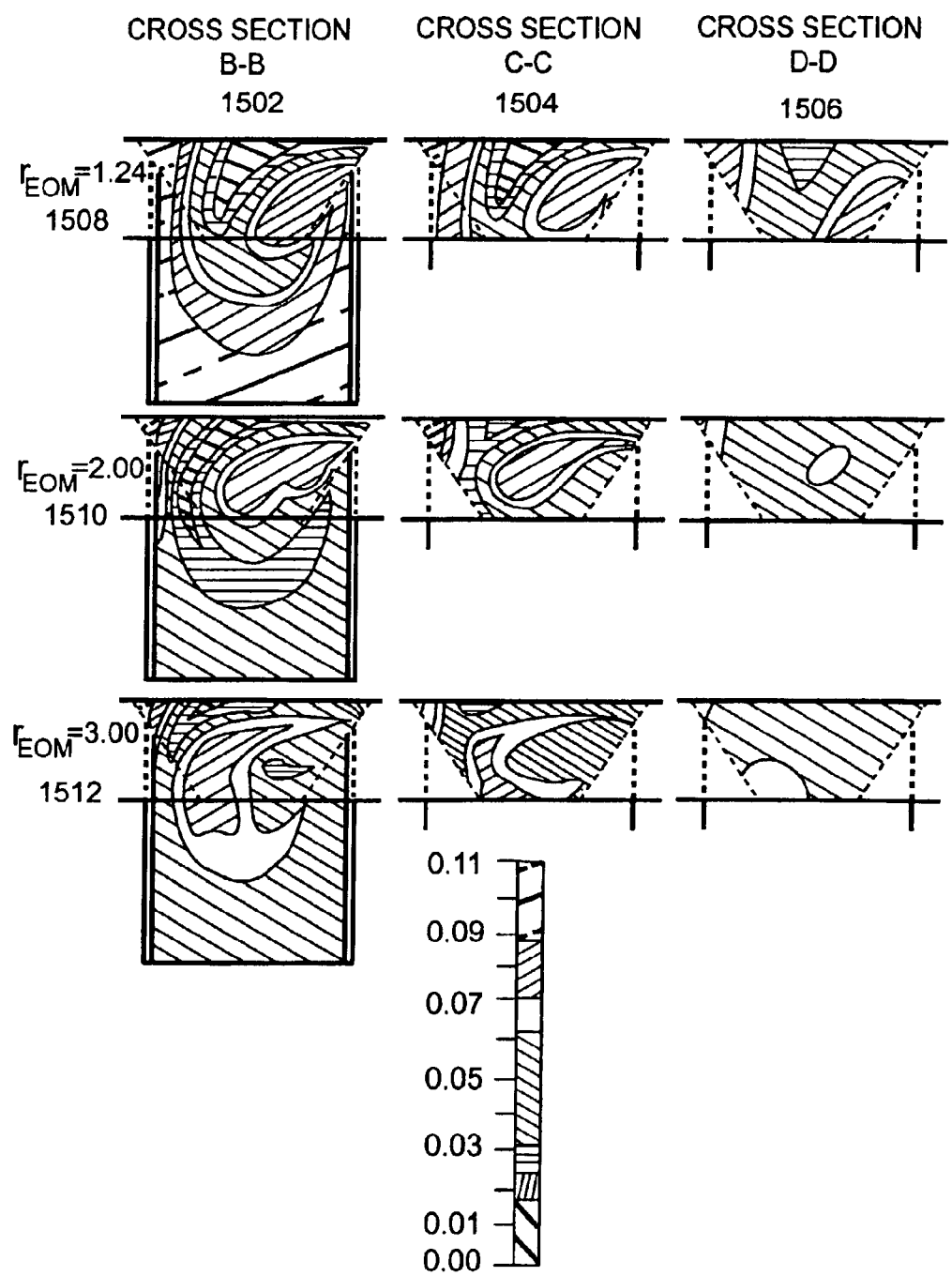
FIG. 15 illustrates some computational results of changes in the electroosmotic (EO) mobility of the surfaces of the wells.

FIG. 15 illustrates the results of changes in the electroosmotic (EO) mobility of the surfaces of the wells. Different manufacturing processes may create different EO mobilities on various surfaces of the channels. For example, of the manufacturing processes described for the experiments described elsewhere in this specification, imprinting a channel has been shown to yield a different EO mobility than the laser ablation manufacturing method. Further, other methods such as polyelectrolyte multilayers, surface chemistry modifications, EO mobility suppression coatings, and other methods may be used individually or in combination to selectively change the EO mobility of selective surfaces of the mixer.

The results of FIG. 15 illustrate the effects of increasing the EO mobility of the surfaces of the wells with respect to the EO mobility of the remaining surfaces of the mixer. The results are for a four well mixer with 45 degree wells at a depth of 50 µm below the bottom of the imprinted channel. The column 1502 illustrates the results for section B—B, column 1504 illustrates the results for section C—C, and column 1506 illustrates the results for section D—D, all of which relate the cross sections illustrated in FIG. 11.

For the purposes of this discussion, a ratio of the EO mobility of the wells divided by the EO mobility of the remainder of the surfaces will be $r_{EOM}$. The row 1508 illustrates the results when $r_{EOM}$ is 1.24. Row 1510 illustrates the results for $r_{EOM}$ of 2.00 and row 1512 illustrates the results for $r_{EOM}$ of 3.00. Row 1508 is illustrative of the approximate $r_{EOM}$ of the experimental results described in FIGS. 7, 8, and 9. The results indicate that as the $r_{EOM}$ is increased, mixing can be enhanced. In other words, the increase of the EO mobility, by different manufacturing processes, selectively applied coatings, or other methods may dramatically increase the performance of a mixer of the present invention.

A use for the present invention is the mixing of plugs of fluid. Applications for such a use may be for lab on chip applications wherein several samples of fluid may be analyzed in succession. It would be desirable for the plugs of fluid to be efficiently mixed, but to minimize the axial dispersion of the plug.

Figure 16A:
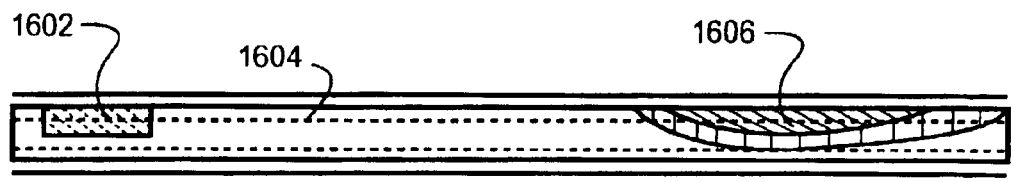
FIG. 16A illustrates a plug of fluid introduced to and transported by a channel.

FIG. 16A illustrates a plug of fluid 1602 introduced into the channel 1604. The channel 1604 illustrates a case wherein the wells of the present invention are not present and represents a baseline case. The mixed plug 1606 is shown downstream.

Figure 16B:
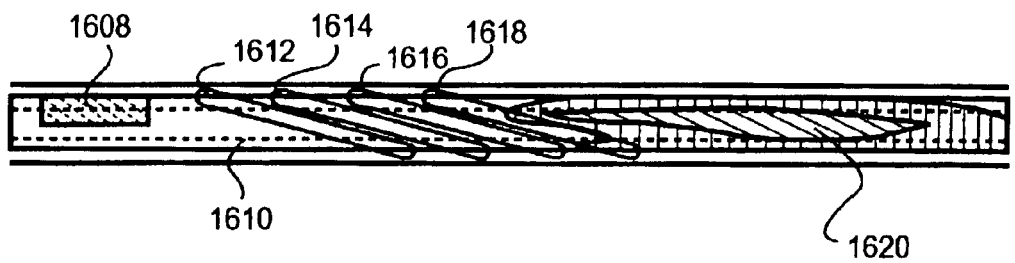
FIG. 16B illustrates an embodiment of the present invention wherein a plug of fluid is introduced into a channel in which four wells are disposed.
Figure 16B:
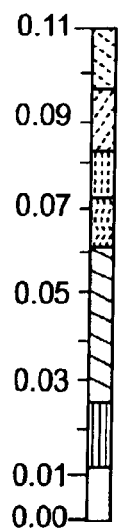

FIG. 16B illustrates an embodiment of the present invention wherein a plug of fluid 1608 is introduced into a channel 1610 in which four wells 1612, 1614, 1616, and 1618 are disposed. The mixed plug 1620 is shown downstream. For FIG. 16B, $r_{EOM}$ is set to 2.00.

Figure 17:
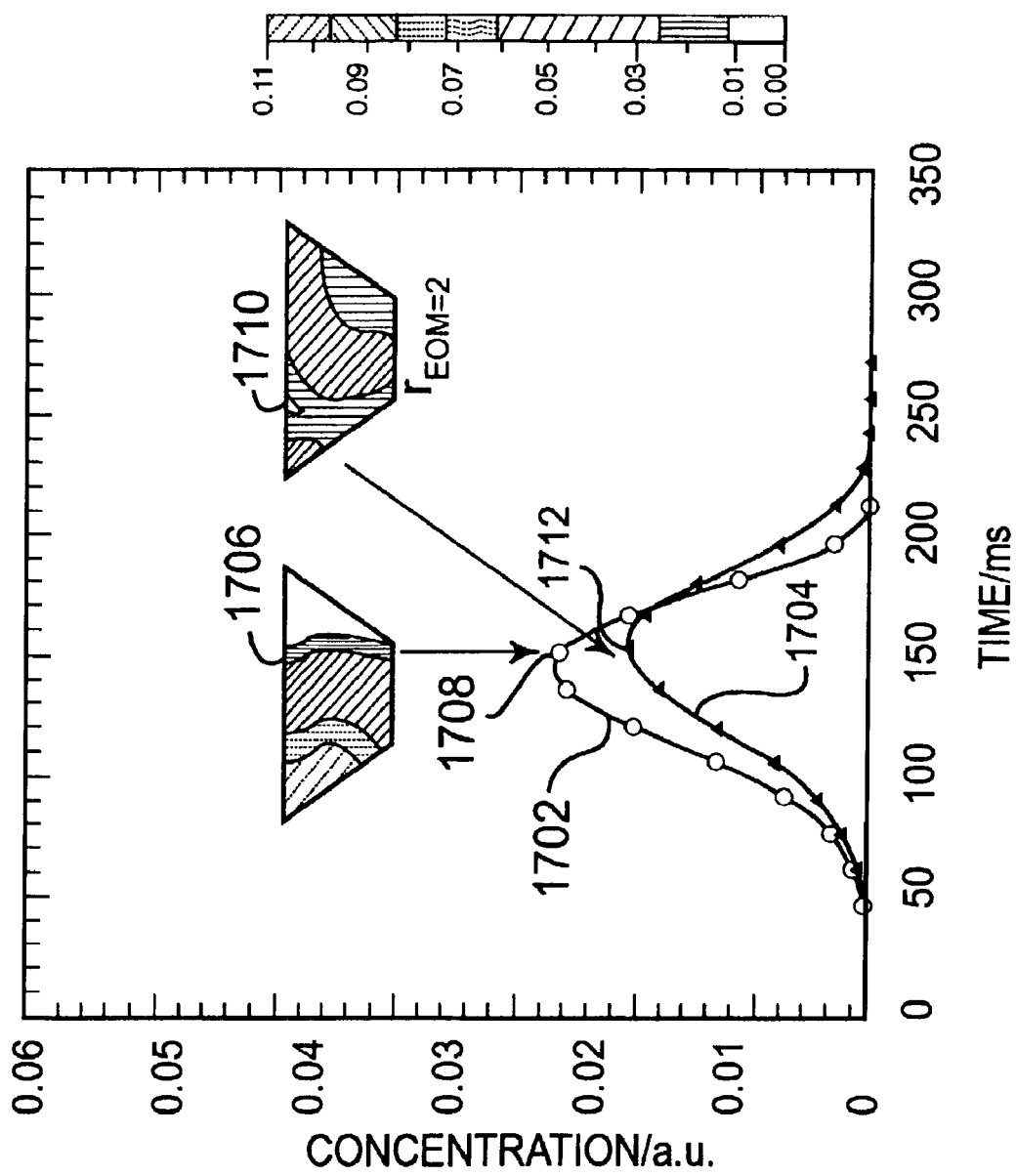
FIG. 17 illustrates some results of a computational analysis of the flow of the embodiments of FIGS. 16A and 16B.

FIG. 17 illustrates the results of a computational analysis of the flow of the embodiments of FIGS. 16A and 16B. The curves 1702 and 1704 illustrate the average concentration of the plug as it passes the outlet of the mixing channel over time. Curve 1702 represents the plug of fluid from FIG. 16A and curve 1704 represents the plug of fluid from FIG. 16B, with $r_{EOM}$ equal to 2.00.

The cross section 1706 represents the analysis results for the point 1708 and cross section 1710 represents the analysis for the point 1712. Both cross sections are the approximate high point of the concentration. For cross section 1706, the plug flow with no wells, the average concentration of the reagent is approximately 28% higher than the cross section 1710. However, the standard deviation, an approximate measure of the degree of mixing, is approximately 3.6 times higher for cross section 1706 wherein no wells were present. The lower standard deviation of the mixture that passed through the inventive wells indicates that the plug of reagent was very well mixed. Further, from the curve 1712, the plug of fluid is still intact, although slightly elongated when compared to the reagent that was not passed over the inventive wells.

The present invention is a passive device that greatly enhances the mixing of reagents under electrokinetic flow, and to a lesser degree, under pressure driven flow. The present invention significantly decreases the channel length required for mixing reagents by placing wells in the flow channel at oblique angles to the axis of flow. The wells may be of various depths, however, for a given set of reagents, flowrates, and channel geometries, there may be an optimum depth of a well wherein an increased depth may not increase the mixing effectiveness.

Fabrication and operation of the passive micromixing apparatus of the present invention is simplified over approaches that require splitting the fluid flow into multiple smaller channels and then recombining. By contrast, mixing in accordance with the present invention is the result of transverse flow and fluid folding in a single channel, thereby permitting effective mixing of confluent streams with high flow rates.

Electroosmotic flow is a surface driven mechanism that may be enhanced to change the performance of the present invention. For example, increasing the electroosmotic mobility of selective surfaces such as the wells has been shown to increase the effectiveness of the mixer.

The manufacturing process and equipment used in the experiments referenced in this specification are herein defined.

Reagents and Materials. Laser Grade Rhodamine B was used as supplied by Acros Organics (Belgium) and dissolved in 20 mM, pH 9.4 carbonate buffer to a final concentration of 0.11 mM Rhodamine B. The buffer solution was made using deionized water from a Millipore Milli-Q system (Bedford, Mass.), and was filtered before use with a syringe filter (pore size 0.22 μm).

Microchannels were made using polycarbonate sheet (PC; Lexan, G E Co., Mt. Vernon, Ind.). Poly(ethylene terephthalate glycol) (PETG; Vivak, DMS Engineering Plastic Products, Sheffield, Mass.) was used to cover and seal the microchannel substrate. The glass transition temperature of PC and PETG are approximately 150° C. and 81° C., respectively. Polycarbonate was chosen as the substrate material because it has a high absorption cross section to 248 nm light (the wavelength of the excimer laser), therefore ablated structures have minimal surface roughness (<5 nm). PETG was chosen to seal the microchannels because its glass transition temperature is well below that of PC. Therefore, thermal sealing can be performed at a temperature that does not cause distortion of the PC microchannel.

Hot Imprinting Method. Prior to imprinting, the PC substrate was blown clean with ionized air. Channels were hot imprinted in the substrate material using a silicon stamp with a trapezoidal-shaped raised T-channel. The PC was place over the silicon stamp, the two items were then placed between two aluminum heating blocks, and then the temperature was raised to 155° C. Next, the assembly was placed in a hydraulic press and a pressure of 13.8 MPa (2000 psi) was applied for 1.5 hours. The imprinted substrate was then removed from the template and allowed to cool to room temperature. Channel dimensions were measured by optical profilometry.

Figure 18:
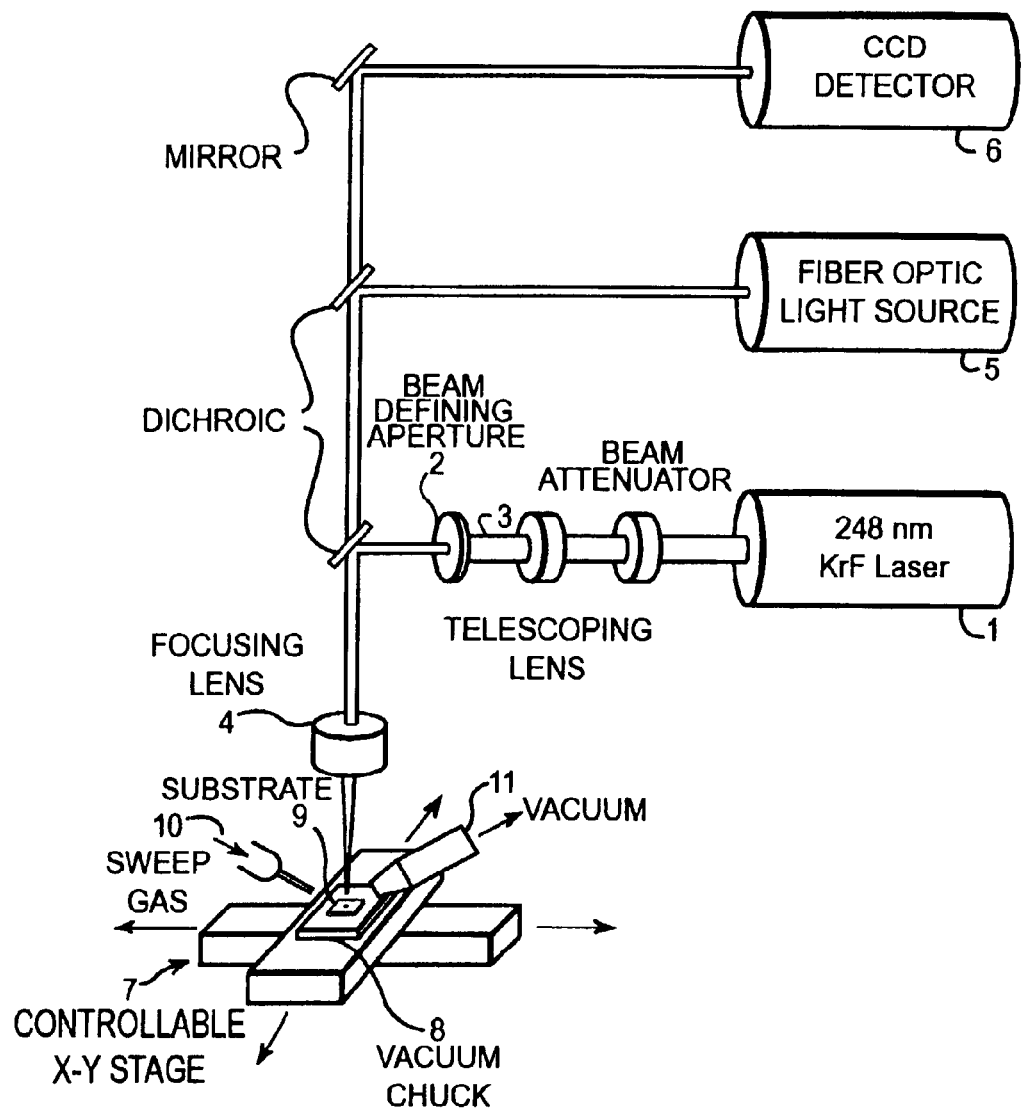
FIG. 18 illustrates the laser apparatus used to manufacture the experimental devices referenced in the specification.

Laser Ablation Method. A 248 nm excimer laser system (LMT-4000, Potomac Photonics, Inc., Lanham, Md.) was used to ablate microstructures within the pre-formed PC microchannel. The excimer laser system, FIG. 18, contains a laser light source 1, a round aperture (200 μm diameter) 2 for delimiting the size and shape of the beam 3, a focusing lens (10× compound) 4, a visible light source 5, a CCD camera to image the ablation process 6, and a controllable X-Y stage 7 with a vacuum chuck 8 to hold the substrate 9 in place. Also, a nozzle 10 was present to sweep nitrogen over the substrate 9 during processing, and a vacuum nozzle 11 was located on the opposite side of the stage to remove debris. For the experiments conducted here, the size-delimiting aperture was chosen such that the ablated features would be smaller than the dimensions of the channel. Also, the X-Y stage was moved linearly at a rate of 1 mm/s, and the ablated wells were at a 45° angle relative to the axis of the main channel. The average power level per pulse was set to 2.04 μJ+/−0.14 μJ. The frequency of pulses was set to 200 Hz, with a constant pulse width of 7 ns. The light after being focused exposed a circular area of $1.90 \times 10^{-6}$ cm$^2$.

Measuring Well Depth and Profile. The depth of the ablated wells was measured by cutting the substrate with a microtome (Microm HM335 E, Walldorf, Germany) either perpendicular to the axis of the outlet channel or parallel to the slanted wells. The substrate was cut so that the edge of the substrate was within a few microns of the wells. The wells were then imaged and measured using white light microscopy.

Microchannel Sealing Procedure. The pre-formed microchannels were covered and thermally sealed with a flat piece of PETG (referred to as the 'lid' throughout the rest of the text) of similar dimensions to the PC. Prior to bonding, the lid and the channel were cleaned with compressed nitrogen gas. The lid was then placed on top of the channel, and the two pieces were clamped together between microscope glass slides and bonded by heating in a circulating air over at 90.0° C.+/−0.5° C. for 13 minutes. It is important to keep the time and temperature as low as possible in the sealing process to avoid physical alteration of the microchannel.

For the electroosmotic flow studies, 3 mm diameter circular holes in the lid provided access to the channels and served as fluid reservoirs. For the pressure driven flow studies, 0.8 mm diameter circular holes in the lid, located at the ends of each inlet channel, provided access to insert a section of hollow stainless-steel tubing. A 3 mm diameter hole in the lid at the end of the outlet channel served as a waste reservoir. For each experiment, the channel arms were fixed to a length of 8 mm.

Flow Image Acquisition. Flourescence imaging of the rhodamine dye was performed using a research fluorescence microscope equipped with a 10× objective, a mercury arc lamp, a rhodamine filer set, and a video camera (COHU, San Diego, Calif.). Digital images were acquired using Scion Image™ software and a Scion LG-3 frame grabber (Scion, Inc., Frederick, Md.). For each experiment, images were captured every $\frac{1}{60}^{th}$ of a second over a duration of 0.67 s, averaged, then recorded.

Experimental Set-up. To image the mixing under electroosmotic flow, the microchannels were initially filled with the carbonate buffer solution. Then, an equal amount (typically 40 μL) of buffer was placed in one inlet channel reservoir and in the outlet channel reservoir, while the second inlet reservoir was filled with the rhodamine-labeled buffer. Platinum electrodes were then placed in contact with the solution in the reservoirs such that the two inlet reservoirs were fixed to ground and the potential was applied to the outlet channel reservoir. The microchannel was placed beneath the fluorescence microscope described in the previous section, and images were acquired at several different applied voltages (0 to −1750V), beginning with zero applied voltage to verify that there was minimal flow resulting from hydrostatic pressure. The current through the microchannel was determined by measuring the voltage drop across a 100 kΩ resistor (typically less than $\frac{1}{1000}$ the resistance of the microchannel) connected to the high voltage supply in series with the microchannel. For pressure driven flow studies, a programmable syringe pump (Harvard Apparatus PHD 2000, Holliston, Mass.) was interfaced to the stainless tubing in the inlet reservoirs via Teflon tubing.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of mixing two confluent laminar flows in microchannels comprising:

providing a first inlet stream and a second inlet stream that meet at a confluence point to produce a confluent stream;

passing said confluent stream through a mixing channel, said mixing channel comprising a plurality of substantially straight unconnected wells, said wells being oriented substantially longitudinally across the width of said mixing channel and diagonally across said mixing channel; and producing a mixed laminar flow at the output of said mixing channel.

2. The method of claim 1 wherein alternating wells are configured perpendicular to each other.

3. The method of claim 1 wherein said wells are configured parallel to each other.

4. The method of claim 1 wherein said microfluidic streams are propelled by pressure.

5. The method of claim 1 wherein said microfluidic streams are propelled by electrokinetics.

6. The method of claim 5 wherein at least a portion of the surface of said wells having an electroosmotic mobility that is different from at least a portion of the surface of said mixing channel.

7. The method of claim 1 wherein said first inlet stream comprises a plug of reagent.

* * * * *